US010221702B2

(12) United States Patent
Dawson et al.

(10) Patent No.: US 10,221,702 B2
(45) Date of Patent: Mar. 5, 2019

(54) IMPARTING HIGH-TEMPERATURE WEAR RESISTANCE TO TURBINE BLADE Z-NOTCHES

(71) Applicant: KENNAMETAL INC., Latrobe, PA (US)

(72) Inventors: Joel T. Dawson, Irwin, PA (US); Danie DeWet, Belleville (CA); Qingjun Zheng, Export, PA (US)

(73) Assignee: KENNAMETAL INC., Latrobe, PA (US)

( * ) Notice: Subject to any disclaimer, the term of this patent is extended or adjusted under 35 U.S.C. 154(b) by 881 days.

(21) Appl. No.: 14/628,912

(22) Filed: Feb. 23, 2015

(65) Prior Publication Data

US 2016/0245099 A1 Aug. 25, 2016

(51) Int. Cl.
| | |
|---|---|
| *F01D 5/28* | (2006.01) |
| *C23C 24/08* | (2006.01) |
| *B22F 7/06* | (2006.01) |
| *B23K 35/00* | (2006.01) |
| *F01D 5/00* | (2006.01) |
| *F01D 11/12* | (2006.01) |
| *B23K 35/30* | (2006.01) |
| *B22F 5/04* | (2006.01) |

(52) U.S. Cl.
CPC .............. *F01D 5/288* (2013.01); *B22F 7/06* (2013.01); *B23K 35/00* (2013.01); *B23K 35/3046* (2013.01); *C23C 24/08* (2013.01); *F01D 5/005* (2013.01); *F01D 11/12* (2013.01); *B22F 5/04* (2013.01); *B22F 2998/10* (2013.01); *F05D 2230/22* (2013.01); *F05D 2230/31* (2013.01); *F05D 2300/175* (2013.01); *F05D 2300/5023* (2013.01)

(58) Field of Classification Search
CPC ... B22F 5/04; C22F 1/10; F01D 5/288; C23C 24/08
USPC ........................................................ 148/675
See application file for complete search history.

(56) References Cited

U.S. PATENT DOCUMENTS

| | | | |
|---|---|---|---|
| 3,005,795 A | 10/1961 | Busse et al. | |
| 3,024,128 A | 3/1962 | Dawson et al. | |
| | (Continued) | | |

FOREIGN PATENT DOCUMENTS

| | | |
|---|---|---|
| CN | 101994114 A | 3/2011 |
| CN | 102922168 A | 2/2013 |
| | (Continued) | |

OTHER PUBLICATIONS

Jul. 7, 2015 Office action (3 months) 1 20140271319.
(Continued)

*Primary Examiner* — Weiping Zhu
(74) *Attorney, Agent, or Firm* — Larry R. Meenan (57) ABSTRACT

A method of imparting wear-resistance to a contact face of a turbine blade Z-notch comprising applying a flexible cladding sheet comprising a Co-based cladding alloy and an organic binder to the contact face of the Z-notch, heating the turbine blade Z-notch with flexible cladding sheet thereon to volatilize the organic binder and remove it from the cladding sheet, and further heating the turbine blade Z-notch with flexible cladding sheet thereon to sinter the cladding sheet by liquid phase sintering, thereby cladding the cladding sheet to the contact face to produce a wear-resistant layer thereon.

20 Claims, 9 Drawing Sheets

(56) References Cited

U.S. PATENT DOCUMENTS

| | | |
|---|---|---|
| 3,281,511 A | 10/1966 | Goldsmith |
| 3,533,930 A | 10/1970 | Lawton et al. |
| 3,541,070 A | 11/1970 | Ahrabi |
| 3,556,161 A | 1/1971 | Roberts |
| 3,677,853 A | 7/1972 | Anzelone, Jr. et al. |
| 3,743,556 A | 7/1973 | Breton et al. |
| 3,778,586 A | 12/1973 | Breton et al. |
| 3,838,092 A | 9/1974 | Vogt et al. |
| 3,853,690 A | 12/1974 | McGarry et al. |
| 3,864,124 A | 2/1975 | Breton et al. |
| 3,876,447 A | 4/1975 | Lally |
| 3,916,506 A | 11/1975 | Wolf |
| 3,988,405 A | 10/1976 | Smith et al. |
| 4,000,781 A | 1/1977 | Knapp |
| 4,073,639 A | 2/1978 | Duvall |
| 4,102,399 A | 7/1978 | Harnsberger |
| 4,194,040 A | 3/1980 | Breton et al. |
| 4,242,842 A | 1/1981 | Yancey |
| 4,381,944 A | 5/1983 | Smith, Jr. |
| 4,478,871 A | 10/1984 | Sakaguchi et al. |
| 4,493,451 A | 1/1985 | Clark |
| 4,544,377 A | 10/1985 | Schwen |
| 4,596,691 A | 6/1986 | Ruppert et al. |
| 4,596,746 A | 6/1986 | Morishita |
| 4,614,296 A | 9/1986 | Lesgourgues |
| 4,830,934 A | 5/1989 | Ferrigno |
| 4,884,477 A | 12/1989 | Smith et al. |
| 4,910,098 A | 3/1990 | Lee |
| 4,919,013 A | 4/1990 | Smith et al. |
| 4,939,101 A | 7/1990 | Black et al. |
| 4,940,566 A | 7/1990 | Wood |
| 4,966,748 A | 10/1990 | Miyasaka et al. |
| 5,070,591 A | 12/1991 | Quick et al. |
| 5,147,460 A | 9/1992 | Otaki |
| 5,156,321 A | 10/1992 | Liburdi |
| 5,161,728 A | 11/1992 | Li |
| 5,164,247 A | 11/1992 | Solanki et al. |
| 5,236,116 A | 8/1993 | Solanki et al. |
| 5,238,881 A | 8/1993 | Norris |
| 5,240,491 A | 8/1993 | Budinger |
| 5,271,547 A | 12/1993 | Carlson |
| 5,348,215 A | 9/1994 | Rafferty |
| 5,352,526 A | 10/1994 | Solanki et al. |
| 5,441,762 A | 8/1995 | Gray et al. |
| 5,492,550 A | 2/1996 | Krishnan et al. |
| 5,523,169 A | 6/1996 | Rafferty |
| 5,523,170 A | 6/1996 | Budinger |
| 5,593,726 A * | 1/1997 | Nicholls ............... C23C 24/082 427/189 |
| 5,641,921 A | 6/1997 | Dennis et al. |
| 5,660,320 A | 8/1997 | Hoffmuller et al. |
| 5,743,033 A | 4/1998 | Gegel |
| 5,868,819 A | 2/1999 | Guhde et al. |
| 5,952,042 A | 9/1999 | Rafferty |
| 6,073,518 A | 6/2000 | Chow et al. |
| 6,103,186 A | 8/2000 | Sievers et al. |
| 6,113,730 A | 9/2000 | Ohya et al. |
| 6,171,709 B1 | 1/2001 | Koizumi et al. |
| 6,649,682 B1 | 11/2003 | Breton et al. |
| 6,749,894 B2 | 6/2004 | Subramanian et al. |
| 7,017,793 B2 | 3/2006 | Kinstler |
| 7,115,679 B2 | 10/2006 | Ellison |
| 7,198,209 B2 | 4/2007 | Herbst |
| 7,250,123 B2 | 7/2007 | Fujioka et al. |
| 7,326,892 B1 | 2/2008 | Cretegny |
| 7,661,491 B2 | 2/2010 | Kembaiyan et al. |
| 7,789,288 B1 | 9/2010 | Johnson |
| 7,968,218 B2 | 6/2011 | Pitonak et al. |
| 8,034,154 B2 | 10/2011 | Singer |
| 8,087,565 B2 | 1/2012 | Kottilingam |
| 8,273,148 B2 | 9/2012 | Minor |
| 8,808,870 B2 | 8/2014 | Zheng et al. |
| 2004/0191064 A1 | 9/2004 | Guo |
| 2004/0234820 A1 | 11/2004 | Majagi |
| 2006/0134455 A1 | 6/2006 | Belhadjhamida et al. |
| 2006/0134456 A1 | 6/2006 | Ikeda et al. |
| 2007/0141375 A1 | 6/2007 | Budinger |
| 2007/0224349 A1 | 9/2007 | Hosenfeldt et al. |
| 2009/0084895 A1 | 4/2009 | Holwerk |
| 2009/0123268 A1 | 5/2009 | Brittingham et al. |
| 2009/0139607 A1 | 6/2009 | Kool |
| 2009/0255714 A1 | 10/2009 | Sohn et al. |
| 2010/0215983 A1 | 8/2010 | Patel et al. |
| 2010/0261419 A1 | 10/2010 | Sung |
| 2011/0067796 A1 | 3/2011 | Belhadjhamida et al. |
| 2011/0070119 A1 | 3/2011 | Belhadjhamida et al. |
| 2012/0077058 A1 | 3/2012 | Ding |
| 2013/0149552 A1 | 6/2013 | Yao |
| 2013/0255843 A1* | 10/2013 | Kiuchi ................. C22C 19/055 148/556 |
| 2013/0344344 A1 | 12/2013 | Gastor |
| 2014/0057124 A1 | 2/2014 | Komolwit et al. |
| 2014/0212681 A1 | 7/2014 | Cui |
| 2014/0271318 A1 | 9/2014 | Zheng et al. |
| 2014/0271319 A1 | 9/2014 | Zheng et al. |
| 2014/0272446 A1 | 9/2014 | Zheng et al. |

FOREIGN PATENT DOCUMENTS

| | | |
|---|---|---|
| DE | 10016830 A1 | 7/2001 |
| EP | 0152263 B1 | 7/1989 |
| JP | 6077962 | 5/1985 |
| JP | 3070658 | 7/2000 |
| JP | 2011166040 | 8/2011 |
| JP | 2011166040 A | 8/2011 |
| WO | WO1994011139 A1 | 5/1994 |
| WO | 2014150311 | 9/2014 |
| WO | 2014150323 A1 | 9/2014 |

OTHER PUBLICATIONS

JJ Conway et al., ASM Manual "Hot Isostatic Pressing of Metal Powders".
EP 147693485, Oct. 28, 2015 EPO Notification R161(1) & R.162 EP 147693485.
German, Randall M., Powder Metallurgy and Paniculate Materials Processing.
Jan. 25, 2016 Notice of Allowance K-04253-US-NP.
Oct. 21, 2015 Office action (3 months) 2 20140271318.
Sulzer, Material Product Data Sheet.
K.J. Pallos, Gas Turbine Repair Technology.
Xiao Huang et al., Wide Gap Braze Repair of Gas Turbine Blades and Vanes.
Dec. 13, 2017 Final Office Action K-06011-US-NP.
Nov. 24, 2016 EPO Notification R70a(2)&R70(2) K-04253-EP-EPT.
Abstract of JP2011166040; Aug. 25, 2011.
International Search Report and Written Opinion, PCT/US2014/022947, dated Jun. 20, 2014.
International Preliminary Report PCT/US2014/022947.
Aug. 12, 2016 Office action (3 months) 1 K-06011-US-NP.
Sep. 14, 2016 EPO Notification R64/164 K-04253-EP-EPT.
Nov. 7, 2016 Search report K-04253-EP-EPT.
May 20, 2016 Final Office Action K-04252-US-NP.
Jul. 4, 2014 International Search Report and Written Opinion K-4079USWO1-PCT.
Sandmeyer Steel Company, Food Processing, internet article, https://www.sandmeyersteel.com/food-processing.html, 5 pages.
Incoloy alloy 825, Special Metals, internet article, https://www.specialmetals.com, 4 pages.

* cited by examiner

IMPARTING HIGH-TEMPERATURE WEAR RESISTANCE TO TURBINE BLADE Z-NOTCHES

FIELD OF THE INVENTION

The invention relates to imparting high-temperature wear resistance to contact faces of Z-notches of turbine blades used in gas turbine engines.

BACKGROUND

Turbine blades used in gas turbine engines for various industrial, power generation, marine, and transportation applications have a shroud with so-called Z-notches which are configurations in the turbine blade shroud having a "Z" shape. Adjacent blades interlock at the Z-notches. Because these Z-notches are points of contact between adjacent turbine blades, the contact faces of Z-notches experience wear and erosion. It is therefore desirable that these contact faces are surfaced with a material having high temperature wear and erosion resistance. Furthermore, these contact faces require repair and resurfacing from time-to-time.

Turbine blades are generally cast from superalloys having high levels of nickel and/or cobalt. One such alloy is GTD-111 which has a nominal composition, by weight, of 14% Cr, 9.5% Co, 4.9% Ti, 3.8% W, 3% Al, 2.8% Ta, 1.6% Mo, 0.02% Zr, 0.1% C, 0.012% B, and balance Ni. Surfacing, resurfacing, and repairing components made from GTD-111 and other superalloys by welding techniques present serious technical challenges. For example, plasma transfer arc (PTA) welding involves such high direct heat input to the blade surface that it results in partial melting of the blade material. This is problematic if the blade material is directionally solidified material, because the directional characteristics are lost upon cooling. High heat input weld overlay processes can disadvantageously impart a heat-affected zone to the substrate and alter material characteristics near the heat-affected zone, often causing the blade to become embrittled in that region. Thermal spray processes require substantial clean-up which is inefficient and can risk substrate damage, and the resulting bond is primarily mechanical and not as good as a true metallurgical bond. Using pre-sintered preforms requires a separate brazing material and machining of the substrate, resulting in a diffusion zone in the substrate that has a detrimental effect on its properties.

SUMMARY OF INVENTION

Briefly, therefore, the invention is directed to a method of imparting wear-resistance to a contact face of a turbine blade Z-notch comprising applying a flexible cladding sheet comprising a Co-based cladding alloy and an organic binder to the contact face of the Z-notch, heating the turbine blade Z-notch with flexible cladding sheet thereon to volatilize the organic binder and remove it from the cladding sheet, and further heating the turbine blade Z-notch with flexible cladding sheet thereon to sinter the cladding sheet by liquid phase sintering, thereby cladding the cladding sheet to the contact face to produce a wear-resistant layer thereon. The turbine blade Z-notch is constructed of a Ni-based superalloy and the Co-based cladding alloy comprises between about 5 and about 20 wt % Cr, between about 22 and about 32 wt % Mo, between 1 and about 4 wt % Si, between about 0.05 and about 0.5 wt % B, and balance Co, plus incidental impurities. The heating to sinter the cladding sheet is to a temperature between about 2100° F. and about 2280° F. The cladding sheet has a thickness between about 0.01 and about 0.125 inch.

Other aspects and features of the invention will be in part apparent and in part pointed out hereinafter.

DETAILED DESCRIPTION

Figure 1:
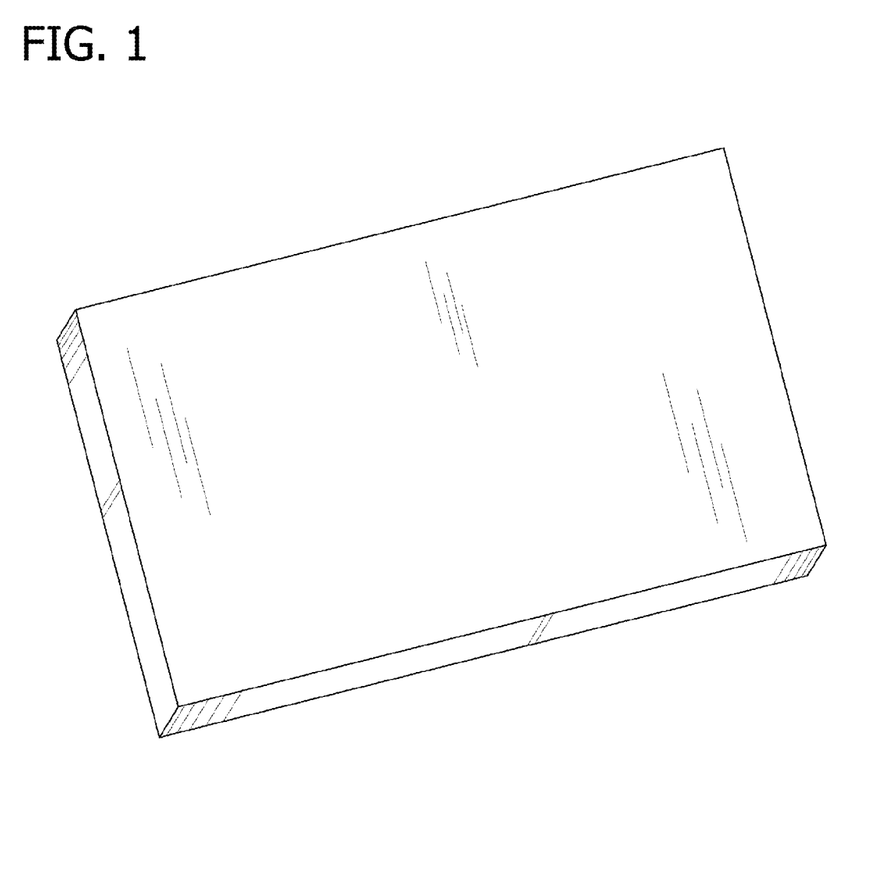
FIG. 1 is a schematic representation of a cladding sheet for use in the method of the invention.
Figure 2:
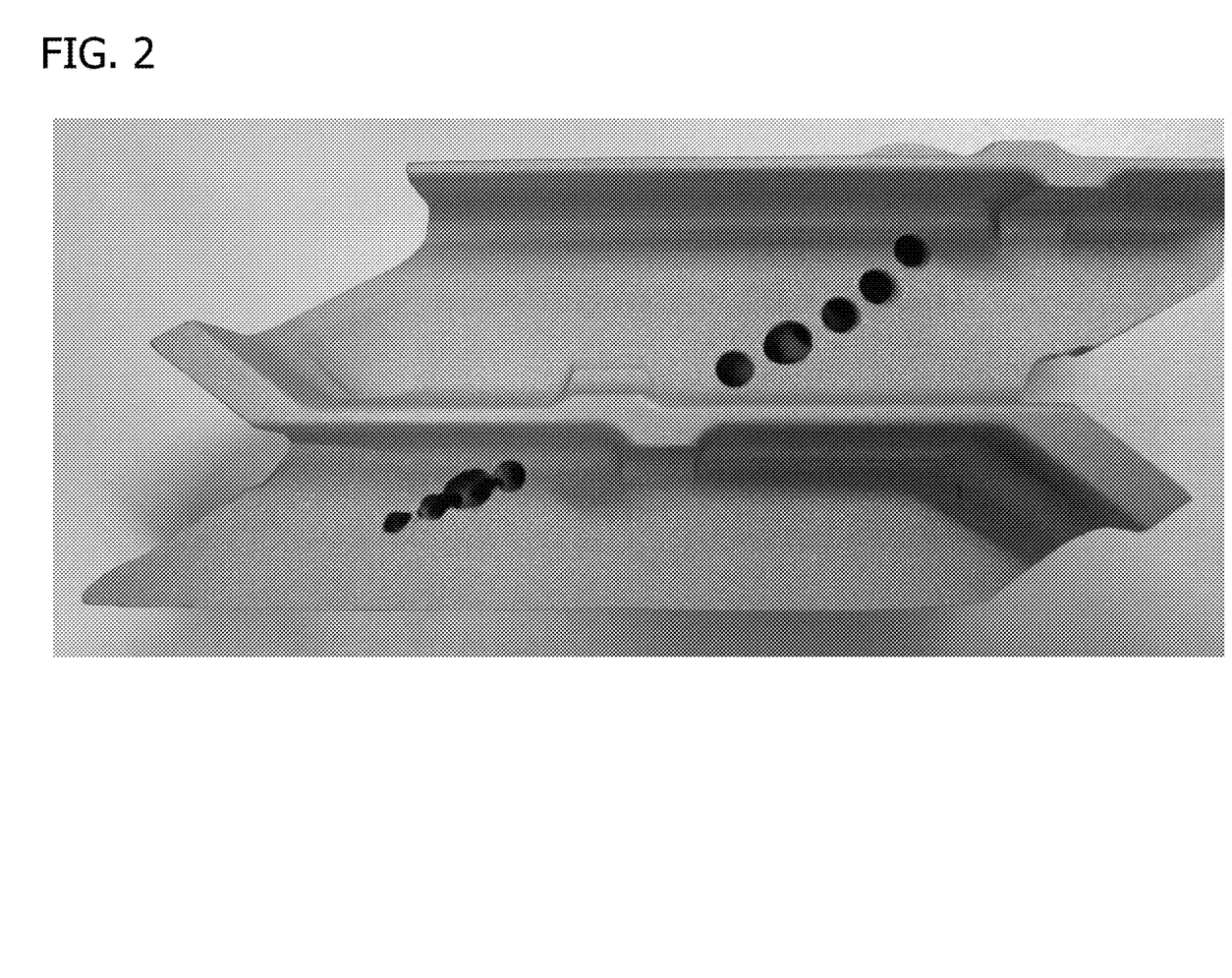
FIG. 2 is a photograph of a turbine blade Z-notch.
Figure 3:
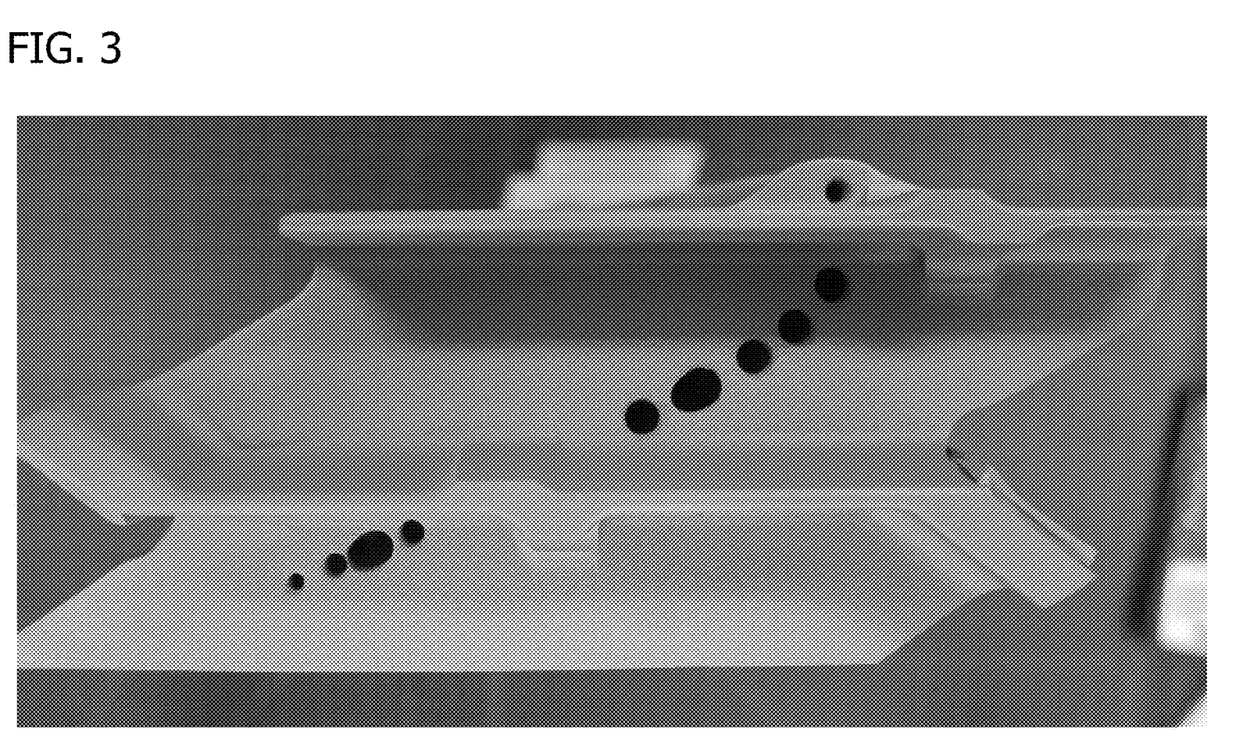
FIG. 3 is a photograph of a turbine blade Z-notch with cladding applied to contact faces.

In accordance with this invention, a contact face of a Z-notch of a turbine blade is cladded by placing a sheet comprising an organic binder and a cobalt-based alloy powder onto the contact face and heating the alloy to provide a sintered Co-based alloy cladding metallurgically bonded to the Z-notch contact face. After sintering, the Co-based alloy is substantially fully dense. FIG. 1 is a schematic representation of a cladding sheet used in the method of the invention. FIG. 2 shows a turbine blade Z-notch with a contact face indicated at C, and FIG. 3 shows the Z-notch with cladding applied according to the invention. The method of the invention is suitable for preparing new components as well as for repairing and refurbishing components that have already had substantial service hours. A primary initial application for the invention is in the context of turbine blades for power generation applications The Co-based alloy used in this invention comprises between about 5 and about 20 wt % Cr, between about 22 and 32 wt % Mo, between 1 and about 4 wt % Si, and balance Co. The alloy also contains incidental impurities, preferably in a total concentration of no more than 6 wt %. In one preferred embodiment, the alloy comprises between about 15 and about 20 wt % Cr, between about 26 and 30 wt % Mo, between 2.5 and about 4 wt % Si, and balance Co, plus incidental impurities. All percentages herein are by weight unless otherwise noted. One particular exemplary alloy contains Cr-17%, Mo-28%, Si-3.25%, and balance Co, which is available from Kennametal Stellite under the trade designation Tribaloy T-800®. The alloy powder is pre-alloyed as opposed to being a mixture of elemental powders.

In addition to the above components, the alloy also includes boron in low amounts in the alloy to lower the solidus temperature of the alloy. This allows the coating to be sintered according to the methods described below at a low enough temperature such that excess diffusion from the metal body into the coating is avoided. In one preferred embodiment, the alloy comprises B in the range of about 0.05 to about 0.5 wt %. Less than about 0.05% does not have significant impact on the sintering temperature in these alloys. Greater than about 0.5% B is avoided because of its impact on the mechanical and high temperature properties of the alloy. In one preferred embodiment, the B content is between about 0.05 and about 0.15 wt %. Accordingly, with the B, the Co-based alloy used in this invention comprises between about 5 and about 20 wt % Cr, between about 22 and 32 wt % Mo, between 1 and about 4 wt % Si, from 0.05 to 0.5 wt % B, and balance Co, plus incidental impurities. In one preferred embodiment, the alloy comprises between about 15 and about 20 wt % Cr, between about 26 and about 30 wt % Mo, between about 2.5 and about 4 wt % Si, between about 0.05 and 0.15 wt % B, balance Co, plus incidental impurities. One particularly preferred embodiment contains Cr-17%, Mo-28%, Si-3.25%, B-0.15 to 0.19%, and balance Co. The solidus temperature of this alloy without the B is about 2350° F. (1290° C.). In this invention, B is added in sufficient quantity to lower the solidus temperature by at least about 150° F. so the alloy has a solidus temperature below about 2200° F. (1205° C.). For example, in one current embodiment the solidus temperature is about 2166° F. (1186° C.)

The particle size of the Co-based powder used in this invention is preferably such that the average particle size of between about 5 μm and about 50 μm, more preferably between about 10 μm and about 30 μm. For example, in one embodiment, the average particle size is 20 μm. Preferably at least about 90 wt % of the particles have a size of less than 30 μm. Preferably 90 wt % of the particles have a size of greater than 7 μm.

The organic binder used in this invention is burned off during the heating process as the cladding material is heated toward the sintering temperature of the powdered cladding alloy. The organic binder used in this invention is therefore selected so that it preferably completely volatilizes at a temperature of no more than 1300° F. (700° C.) and so that it is easily distributed throughout the powder mixture before formation of the sheet. In one preferred embodiment, the organic binder material comprises a polymer material, preferably a fluoropolymer material. One such fluoropolymer is polytetrafluoroethylene (PTFE).

The Co-based alloy is combined with the organic binder to fabricate the sheet. The organic binder powder alloy are mechanically worked or processed to trap the metal or alloy powder in the organic binder. The overall mixture of alloy and binder preferably comprises between about 92 and about 98 vol % alloy powder and between about 2 and about 8 vol % organic binder. In many preferred embodiments, cladding sheet consists essentially of these two components, and in some preferred embodiments, these are the only two components. The volume ratio of alloy powder to organic binder in one exemplary embodiment is preferably between 20:1 and 25:1. In one embodiment, for example, the mixture comprises from 85 to 97 vol % powder alloy and 3-15 vol. % organic binder. The mixture is mechanically worked to fibrillate the PTFE and incorporate the powder alloy into fibrils of organic binder. Mechanical working can include rolling, ball milling, stretching, elongating, spreading or combinations thereof. In some embodiments, the sheet comprising the powder alloy is subjected to cold isostatic pressing. The resulting sheet can have a low elastic modulus and high green strength. In some embodiments, a sheet comprising organic binder and powder metal or powder alloy is produced in accordance with the disclosure of one or more of U.S. Pat. Nos. 3,743,556, 3,864,124, 3,916,506, 4,194,040 and 5,352,526, each of which is incorporated herein by reference in its entirety.

The cladding sheet is worked to have a thickness of at least about 0.010 inch, preferably at least about 0.040 in. The thickness is preferably no more than about 0.125 inch, more preferably no more than about 0.100.

It is important that the cladding sheet be free of tears, rips, and other mechanical inconsistencies. The surfaces of the sheet are flat and free of striations.

Figure 9:
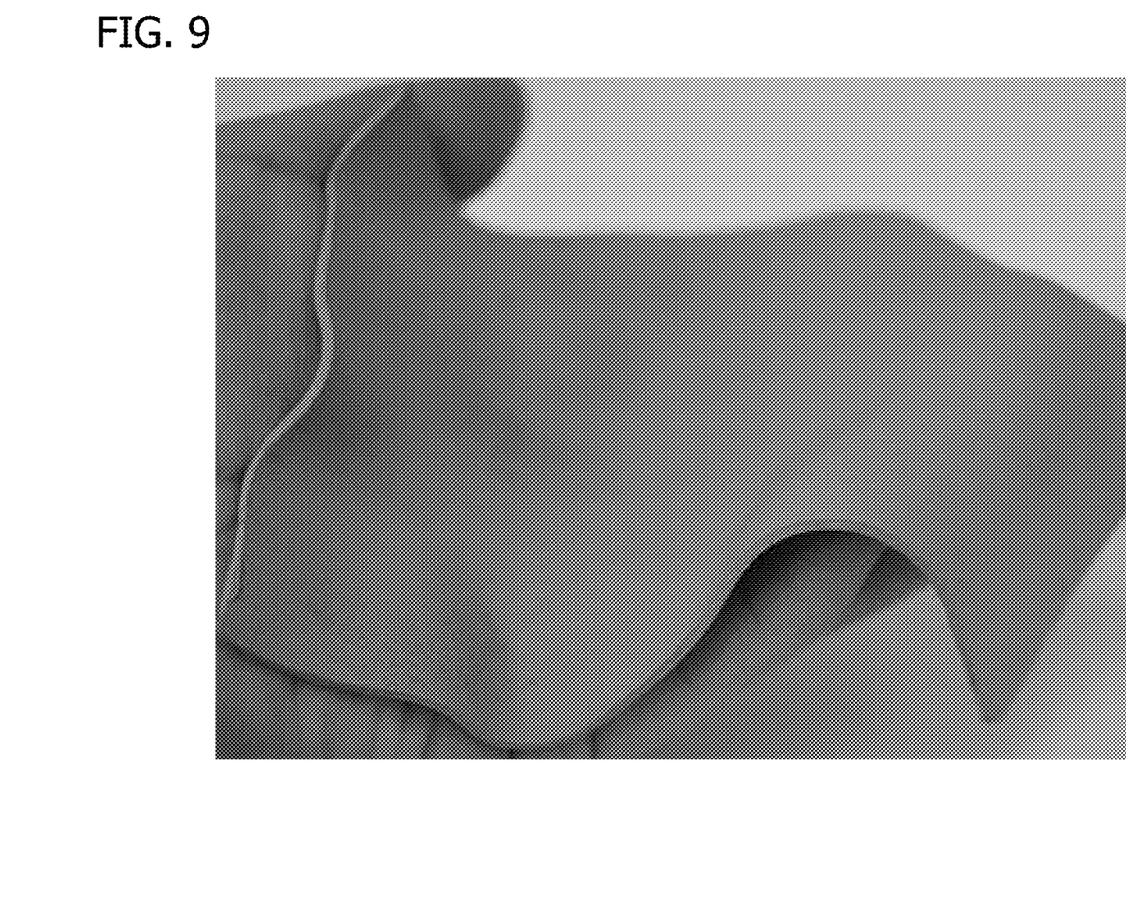
FIG. 9 is a photograph of a cladding sheet of the invention as manufactured from which cladding sheets applied to Z-notches according to the invention are cut.

The cladding sheet is a flexible and pliable material such that its shape is readily deformable by hand so that it can be applied in a manner that it conforms to the shape of the surfaces of the parts being cladded. In fact, the pliability is such that a sheet of the material which is, e.g., 5 inches by 5 inches by 0.1 inch thick deforms under its own weight. A sheet of these dimensions behaves plasticly under its own body weight force at room temperature. Such plasticity is demonstrated in FIG. 9. The cladding sheet shrinks between about 1 and about 20 vol % upon sintering.

The turbine blade employed in the present invention is a preferably a Ni-based superalloy comprising 5 to 15 wt % Cr, 5 to 20 wt % Co, along with other alloying elements and incidental impurities. For example, in one embodiment, the superalloy comprises 8 to 16% Cr, 8 to 12% Co, 3 to 7% Ti, 2 to 5% W, 1 to 4% Al, 1 to 4% Ta, 1 to 2% Mo, up to 0.1% Zr, 0.05 to 0.2% C, up to 0.1% B, and balance Ni (e.g., over 55% Ni), with incidental impurities. One such alloy is GTD-111 which has a nominal composition, by weight, of 14% Cr, 9.5% Co, 4.9% Ti, 3.8% W, 3% Al, 2.8% Ta, 1.6% Mo, 0.02% Zr, 0.1% C, 0.012% B, and balance Ni. Other such alloys are GTD-444 and René 108. The nominal composition of GTD-444 is about 9.5-10% Cr, about 7-8% Co, about 3.35-3.65% Ti, about 4.1-4.3% Al, about 5.75-6.25% W, about 1.30-1.70 Mo, about 4.60-5.0% Ta, about 0.06-0.1% C, about 0.008-0.010% Zr, about 0.008-0.0105% B, and the balance being Ni and incidental impurities. Rene' 108 has a nominal composition of about 9.4% Co, 8.2% Cr, 0.5% Mo, 9.5% W, 3.2% Ta, 5.6% Al, 0.7 percent % Ti, 1.5% Hf, 0.1% C, 0.015% B, balance (about 62.9%) Ni, and incidental impurities. All percentages herein are by weight unless stated otherwise.

A cladding sheet according to the invention is shown schematically in FIG. 1. The sheet comprising organic binder and alloy powder is cut and positioned over the contact face of a turbine blade Z-notch. A turbine blade Z-notch with contact face C is shown in FIG. 2. FIG. 3 shows the turbine blade Z-notch then cladded according to invention. The sheet is adhered to the contact face using an adhesive that decomposes during sintering. The turbine blade is then placed in a sintering furnace and heated. The heating is preferably under vacuum or in an inert atmosphere. The ultimate sintering temperature used in current embodiments of this invention is between about 2100° F. (1150° C.) and about 2280° F. (1250° C.) for between 30 and 120 minutes. The turbine blade is first heated to a temperature at which the organic binder is removed from the cladding sheet. In one embodiment this is accomplished by heating to a temperature between about 2175° F. (1190° C.) and about 2195° F. (1200° C.) and maintaining the temperature in that range for between 30 and 60 minutes. In another embodiment this is accomplished in the normal course of heating to sintering temperature by a temperature ramp of between 5 and 30° F. per minute, as the organic binder of the sheet is decomposed and burned off during the heating process.

The ultimate sintering temperature is carefully selected as a function of the alloy powder cladding material and the alloy of the substrate. The liquidus or liquidus temperature of an alloy is the lowest temperature at which an alloy is completely liquid. The solidus or solidus temperature of an alloy is the highest temperature at which an alloy is completely solid. In other words, as a completely molten alloy is cooled, it begins to solidify when it reaches the liquidus temperature. When the temperature of the alloy is between the liquidus and solidus temperature, it contains both solid and liquid phases. When the temperature of the alloy is at and below the solidus temperature, it is completely solid. When a completely solid alloy is heated above the solidus temperature, phases of the alloy begin to melt. At a temperature between the solidus and liquidus temperatures, there are both solid and liquid phases.

In this invention, the cladding material alloy is selected to have a solidus temperature which is substantially below the solidus temperature of the substrate alloy. It is also selected so there is an effective sintering temperature range for the cladding alloy which is comfortably below the solidus temperature of the substrate. This is so that there is no internal melting or reordering of the substrate crystal structure during sintering of the cladding material. This is critical to preserving the directionally solidified crystal structure of the substrate.

The turbine blade with the cladding material adhered thereto is heated in the sintering furnace to a temperature at which the cladding material undergoes liquid phase sintering. This is sintering at a temperature above the solidus of the cladding material and below the liquidus of the cladding material. At this temperature, there is one or more liquid phases within the cladding alloy, but it is not completely liquid. This is in contrast to solid-state sintering, during which no phases of the material being sintered are in their liquid phase.

In the preferred embodiment, the powder alloy cladding material is a B-modified, Co-based alloy comprising between about 5 and about 20 wt % Cr, between about 22 and 32 wt % Mo, between 1 and about 4 wt % Si, from 0.05 to 0.5 wt % B, and balance Co, plus incidental impurities; and the substrate Z-notch is the above-described Ni-based alloy, either equiaxed or directionally solidified. The solidus temperature of the Co-based cladding material in a currently preferred embodiment is 2166° F. (1185.5° C.), and its liquidus temperature is on the order of 2320-2350° F. (1270-1290° C.). The solidus temperature of the turbine blade substrate is 2344° F. (1284° C.), and its liquidus temperature is 2455° F. (1346° C.). The sintering temperature is selected to be at least about 10 or 15° F. above the solidus of the cladding material, such as between about 10 and about 40° F., preferably between about 10 and 25° F. or between about 15 and 25° F. above the solidus of the cladding material. This temperature is also comfortably below—e.g., at least about 50 or 100° F. below—the solidus of the substrate material. This temperature is also comfortably below—e.g., at least about 50 or 75° F. below—the liquidus of the cladding material. For example, in one embodiment, the cladding material is sintered at a temperature between about 2100° F. (1150° C.) and about 2280° F. (1250° C.) for between 30 and 120 minutes. In another embodiment, the cladding material is sintered at a temperature between about 2120° F. (1160° C.) and about 2200° F. (1205° C.) for between 30 and 60 minutes; for example, between about 2180° F. (1193° C.) and about 2200° F. (1205° C.) or 2190° F. (1200° C.) for between 30 and 60 minutes. The solidification of the cladding material achieved is at least about 95% dense, such as 98% dense. The resulting component has a Z-notch contact face with an integrally clad Co-based wear-resistant layer having a thickness of between about 0.04 inch and about 0.080 inch.

To the extent there is any interfacial diffusion zone at the interface between the cladding and the substrate, it has a depth of less than about 20 μm, preferably less than 10 μm. This is important because diffusion can cause material properties to change in a variety of ways. By avoiding diffusion, one avoids having to account for such changes. And, in many instances, changes in properties would be unacceptable. In the context of the arrangement of the invention, significant diffusion of boron from the cladding into the substrate is avoided which is critical because diffusion of boron would tend to form metal borides in the substrate, which would be embrittling and decrease substrate strength.

An advantage to the method of the invention is that the cladded substrate can be subjected to heat treating to restore the original properties to the substrate that were lost during service or during cladding. This operation can be performed because the high-integrity metallurgical bond of the invention can withstand heat treatment. In one embodiment of the invention, therefore, the turbine blade Z-notch with sintered cladding in one embodiment is subjected to one or more heat treatment operations at a temperature between about 1500° F. and about 2300° F., such as a solution heat treatment and a precipitation heat treatment. For example, the component in one embodiment is subjected to a solution heat treat operation, followed by a precipitation heat treatment, to restore metallurgical properties to the substrate material. An exemplary solution heat treatment is performed at between 2200° F. and 2300° F. and is followed by a precipitation heat treatment at between 1550° F. and 1650° F. For example, one such heat treat operation is a solution cycle of 2228° F. for 2 hrs, followed by a gas fan quench of at least 63° F. per minute to room temperature, before a precipitation cycle at 1600° F. for 4 hours, with again the same gas fan quench cycle to room temperature, to restore gamma prime (γ') phase levels to a GTD-111 type substrate material.

The invention is further illustrated by the following example.

EXAMPLE 1

A cladding sheet was prepared by mixing Co-based alloy powder and polymeric organic binder in a ratio of 96 vol % alloy powder and 4 vol % organic binder. The Co-based alloy powder had an average particle size of 20 μm and a particle size distribution of 10-30 μm/<325 mesh. The alloy material was 16 wt % Cr, 28 wt % Mo, 3 wt % Si, 0.19 wt % B, balance Co as major intentional constituents, with trace elements of 0.02 wt % C, 0.8 wt % Fe, 0.07 wt % Ni, 0.002 wt % S, 0.1 wt % N, 0.02 wt % O, 0.007 wt % P, and 0.01 wt % W. The polymeric organic binder was PTFE. The components were mixed by powder milling/mixing. The components were formed into a sheet by mechanical rolling. The sheet dimensions were 0.5 inch by 0.75 inch with a thickness of 0.04 inch in as-rolled condition. A photograph of the alloy cladding sheet is shown in FIG. 1. A turbine blade Z-notch segment of the type shown in FIG. 2 was presented for cladding. The component with the cladding sheet thereon was then placed in a furnace and heated at a rate of 3° F./minute to a temperature of 2185° F. There were two short hold periods during heat up to allow the components to soak and obtain furnace temperature. The component was maintained at this temperature for 30 minutes for sintering of the cladding material. The component was then cooled and removed from the furnace. An optional, non-critical quench was performed once the parts had cooled to 1400° F. to save cooling time. FIG. 3 is a photograph of the component with the sintered cladding layer on the Z-notch contact surface.

Figure 4:
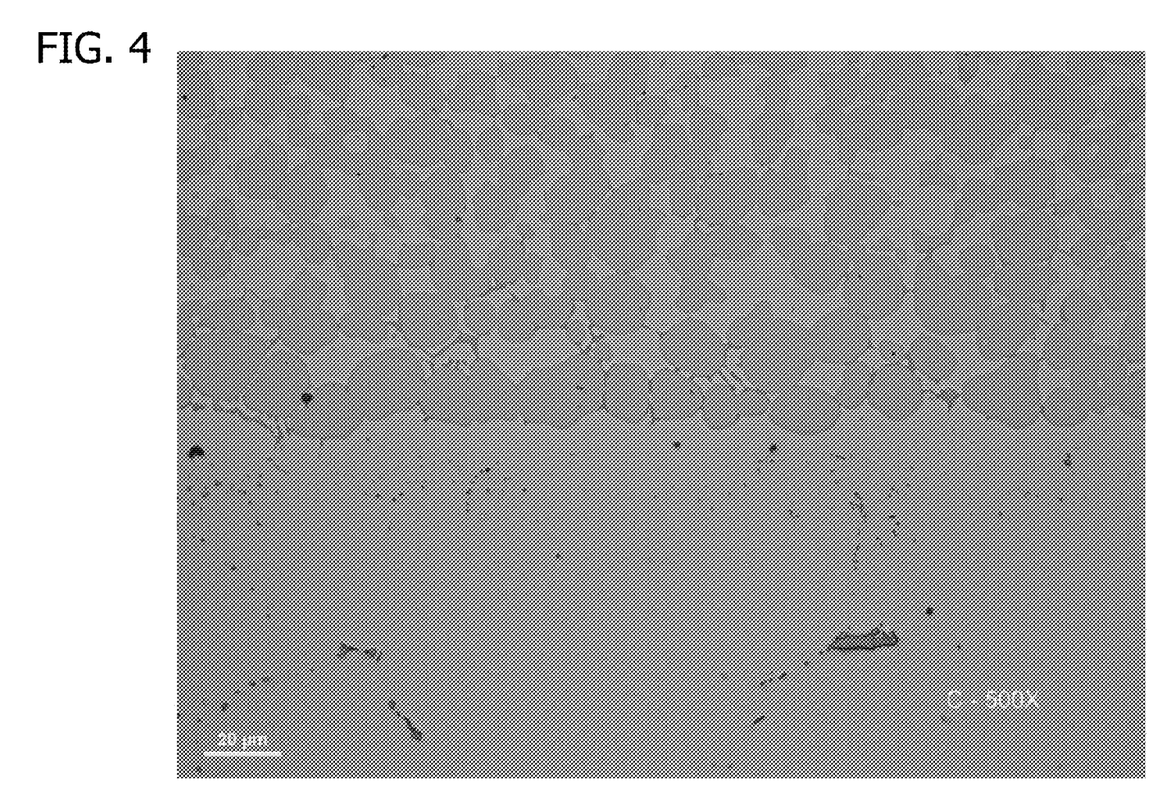
FIG. 4 is a photomicrograph at 500× showing microstructure of cladding applied to a Z-notch substrate.
Figure 5:
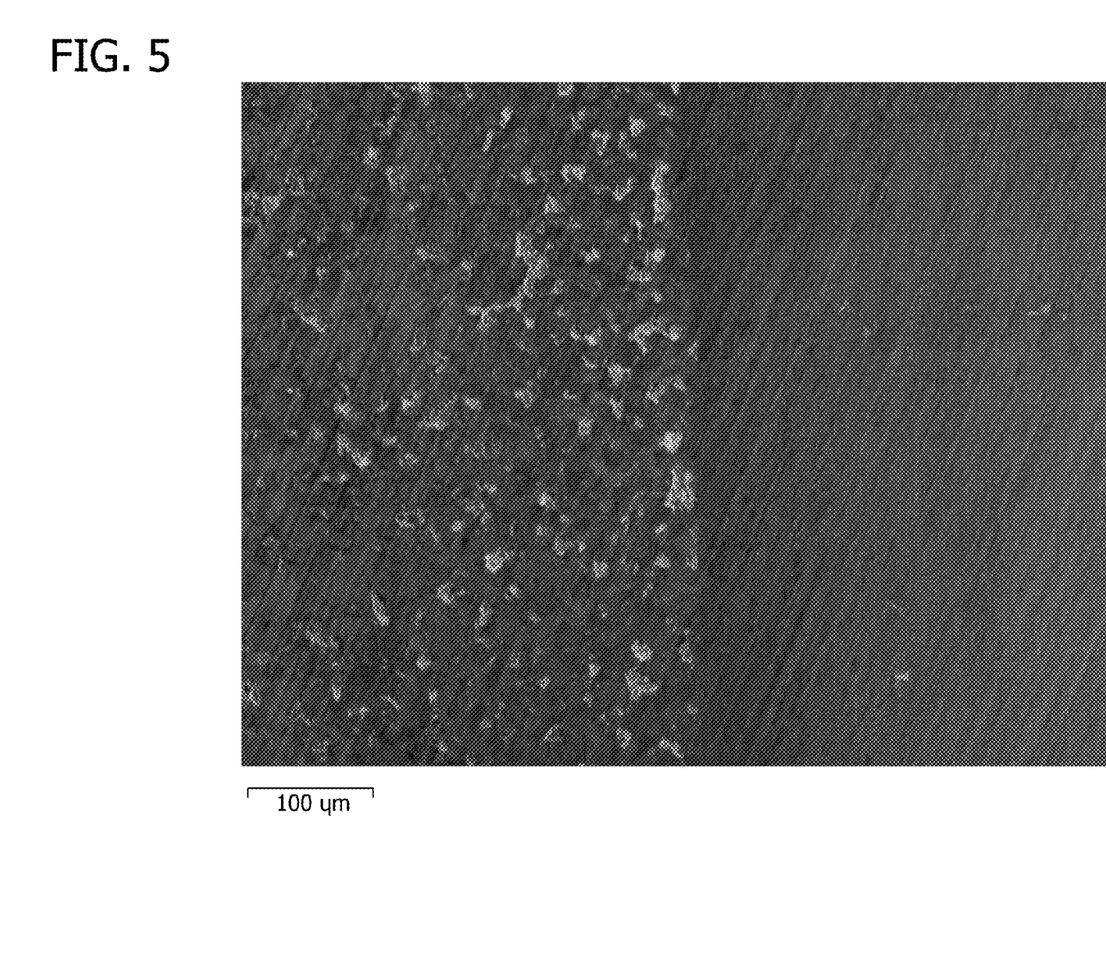
FIG. 5 is an SEM photomicrograph showing cladding applied to a substrate.
Figure 6:
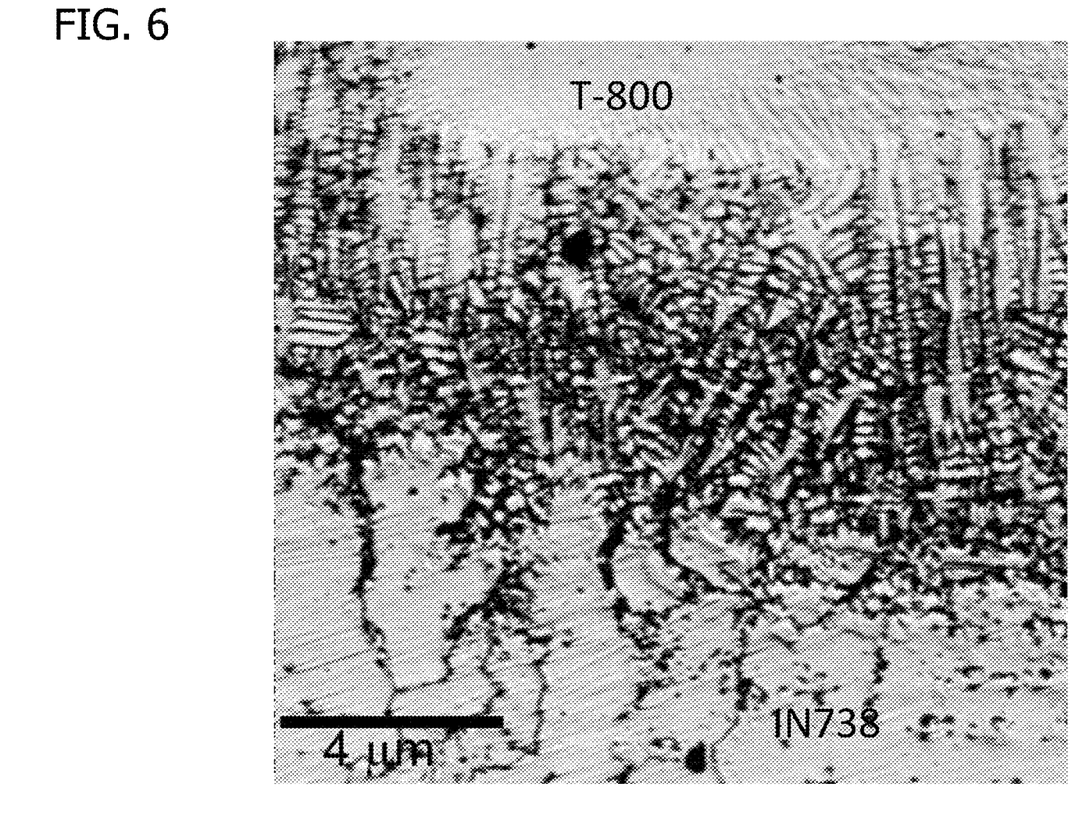
FIGS. 6 and 7 are photomicrographs showing a heat-affected zone at an interface between cladding and substrate in situations where cladding is applied by prior art methods.
Figure 7:
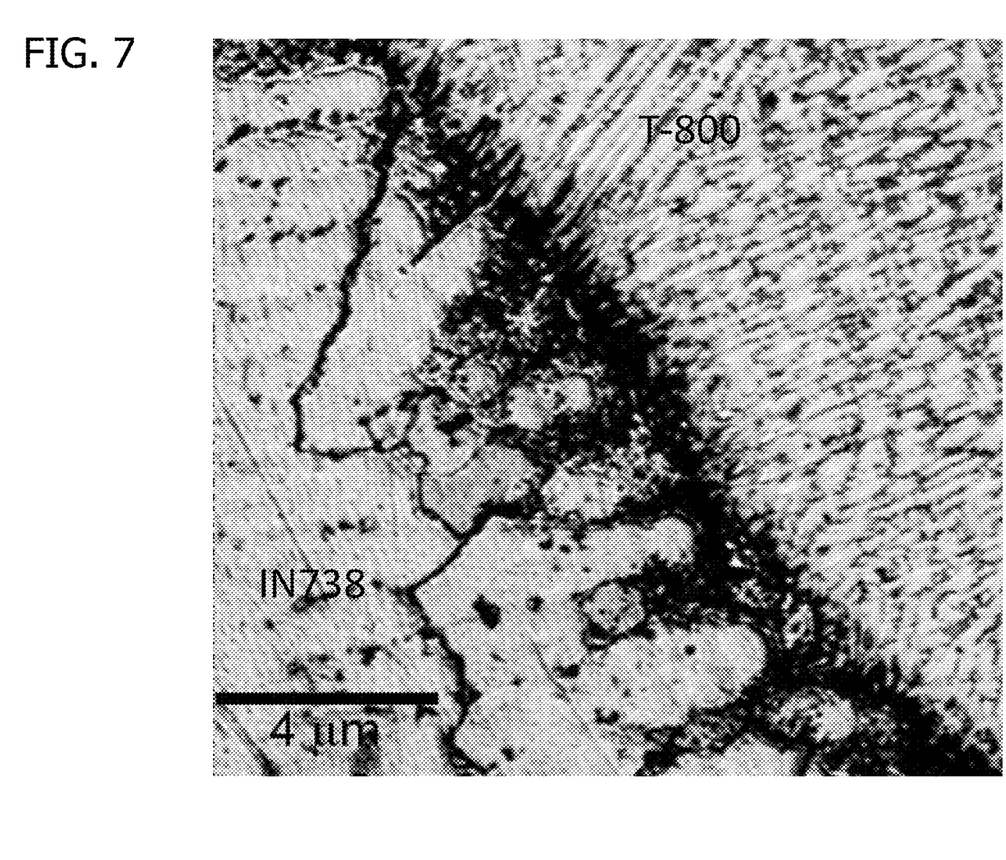

The resulting component was sectioned at the interface between the substrate and the cladding layer and analyzed. The microstructure of the cladding after sintering is shown in FIG. 4. There are nodular particles of Co—Mo—Si intermetallic phases, including laves phases, in a Co-based matrix. The scanning electron microscope image of FIG. 5 shows the cladding material on the left and the substrate on the right. There is no heat-affected zone on the substrate, and no detectable interfacial diffusion zone. This is in contrast to the images in FIGS. 6 and 7 of the interface between alloy T-800 cladding applied to Ni-based substrates by high heat input methods TIG (tungsten inert gas welding) (FIG. 6) and PTA (plasma transferred arc welding) (FIG. 7).

Figure 8:
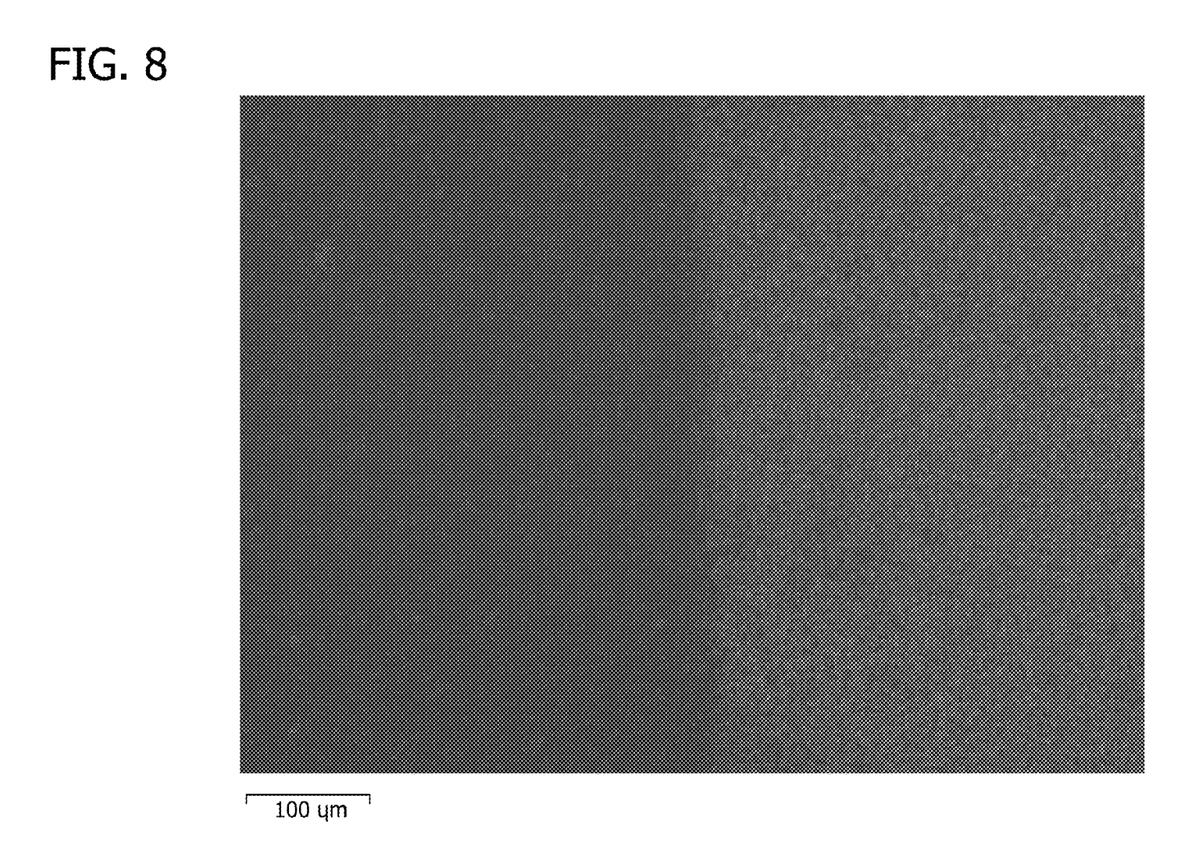
FIG. 8 shows SEM EDS elemental analysis for the presence of Ni.

Elemental analysis for the presence of Ni by SEM EDS (scanning electron microscope energy dispersive spectroscopy) is illustrated in FIG. 8 and shows a sharp line between the substrate and the cladding layer, indicating essentially no interfacial diffusion of Ni from out of the substrate into the cladding layer. Results for Al, Co, Cr, Mo, Fe, Si, Ti, and W show a similar absence of interfacial diffusion.

When introducing elements of the present invention or the preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A method of imparting wear-resistance to a contact face of a turbine blade Z-notch comprising:
   applying a flexible cladding sheet comprising a Co-based cladding alloy and an organic binder to the contact face of the Z-notch;
   heating the turbine blade Z-notch with flexible cladding sheet thereon to volatilize the organic binder and remove it from the cladding sheet;
   further heating the turbine blade Z-notch with flexible cladding sheet thereon to sinter the cladding sheet by liquid phase sintering, thereby cladding the cladding sheet to the contact face to produce a sintered wear-resistant layer thereon;
   wherein the turbine blade Z-notch is constructed of a Ni-based superalloy and the Co-based cladding alloy comprises between 5 and 20 wt % Cr, between 22 and 32 wt % Mo, between 1 and 4 wt % Si, between 0.05 and 0.5 wt % B, and balance Co, plus incidental impurities;
   wherein said further heating to sinter the cladding sheet is to a temperature between about 2100° F. and about 2280° F.;
   wherein the cladding sheet has a thickness between about 0.01 and about 0.125 inch.

2. The method of claim 1 wherein the sintering temperature is at least about 50° F. below a solidus temperature of the Z-notch Ni-based alloy and at least about 50° F. below a liquidus temperature of the Co-based cladding alloy.

3. The method of claim 1 wherein the sintering temperature is at least about 100° F. below a solidus temperature of the Z-notch Ni-based alloy.

4. The method of claim 1 wherein the cladding sheet thickness is between 0.02 inch and 0.1 inch.

5. The method of claim 1 wherein the flexible cladding sheet comprises about 92 to about 98 vol. % of the Co-based alloy and about 2 to about 8 vol. % of the organic binder.

6. The method of claim 1 wherein the flexible cladding sheet consists essentially of about 92 to about 98 vol. % of the Co-based alloy and about 2 to about 8 vol. % of the organic binder.

7. The method of claim 6 wherein the Ni-based superalloy has a nominal composition by weight %, of 14 Cr, 9.5 Co, 4.9 Ti, 3.8 W, 3 Al, 2.8 Ta, 1.6 Mo, 0.02 Zr, 0.1 C, 0.012 B, and balance Ni.

8. The method of claim 6 wherein the Ni-based superalloy has a composition, by weight %, of about 9.5-10% Cr, about 7-8% Co, about 3.35-3.65% Ti, about 4.1-4.3% Al, about 5.75-6.25% W, about 1.30-1.70 Mo, about 4.60-5.0% Ta, about 0.06-0.1% C, about 0.008-0.010% Zr, about 0.008-0.0105% B, and the balance being Ni and incidental impurities.

9. The method of claim 6 wherein the Ni-based superalloy has a composition, by weight %, of about 9.4% Co, about 8.2% Cr, about 0.5% Mo, about 9.5% W, about 3.2% Ta, about 5.6% Al, about 0.7 percent % Ti, about 1.5% Hf, about 0.1% C, about 0.015% B, balance Ni, and incidental impurities.

10. The method of claim 1 further comprising subjecting the turbine blade Z-notch contact face with sintered wear-resistant layer thereon to one or more heat treatment operations at a temperature between about 1500° F. and about 2300° F.

11. The method of claim 10 wherein the one or more heat treatment operations comprise a solution heat treatment followed by a precipitation heat treatment.

12. The method of claim 10 wherein the one or more heat treatment operations comprise a solution heat treatment at between 2200° F. and 2300° F. followed by a precipitation heat treatment at between 1550° F. and 1650° F.

13. The method of claim 1 wherein the Ni-based superalloy comprises Cr in range of about 5 to 20 wt %, Co in a range of about 5 to 20 wt %, and at least about 55 wt % Ni.

14. The method of claim 1 wherein the Ni-based superalloy comprises Cr in range of about 5 to 20 wt %, Co in a range of about 5 to 20 wt %, and at least about 55 wt % Ni, with other alloying elements and incidental impurities.

15. The method of claim 1 wherein the Ni-based superalloy comprises, by weight %, 10 to 16 Cr, 7 to 12 Co, 3 to 7 Ti, 2 to 5 W, 1 to 4 Al, 1 to 4 Ta, 1 to 2 Mo, up to 0.1 Zr, 0.05 to 0.2 C, up to 0.1 B, and balance Ni.

16. The method of claim 1, wherein the sintered wear resistant layer comprises nodular particles of Co—Mo—Si.

17. The method of claim 1, wherein the sintered wear resistant layer comprises laves phases.

18. The method of claim 1, wherein a heat affected zone is absent on the substrate.

19. The method of claim 1, wherein an interfacial diffusion zone between the substrate and sintered wear resistant layer is absent.

20. The method of claim 14, wherein the sintered wear resistant layer comprises laves phases.

* * * * *